United States Patent [19]
Luft

[11] 3,765,306
[45] Oct. 16, 1973

[54] SENSING CYLINDER
[75] Inventor: Robert G. Luft, Wildwood, Ill.
[73] Assignee: International Harvester Company, Chicago, Ill.
[22] Filed: Dec. 21, 1971
[21] Appl. No.: 210,376

Related U.S. Application Data
[62] Division of Ser. No. 52,940, July 7, 1970, abandoned.

[52] U.S. Cl.................... 92/117 A, 92/131, 92/155
[51] Int. Cl....................... F01b 31/10, F01b 15/02
[58] Field of Search............. 92/131, 117 R, 117 A; 91/360

[56] References Cited
UNITED STATES PATENTS
2,110,213   3/1938   Flowers................................ 92/131
3,190,185   6/1965   Rasmussen............................ 92/131
3,537,355   11/1970  Bliss..................................... 92/131

Primary Examiner—Paul E. Maslousky
Attorney—Floyd B. Harman

[57] ABSTRACT

A steering system for a vehicle having a pair of steerable axles and an operator's station at each end. The system provides a means for steering the vehicle from either station and provides a means for selectively steering the vehicle in any one of three different modes.

5 Claims, 4 Drawing Figures

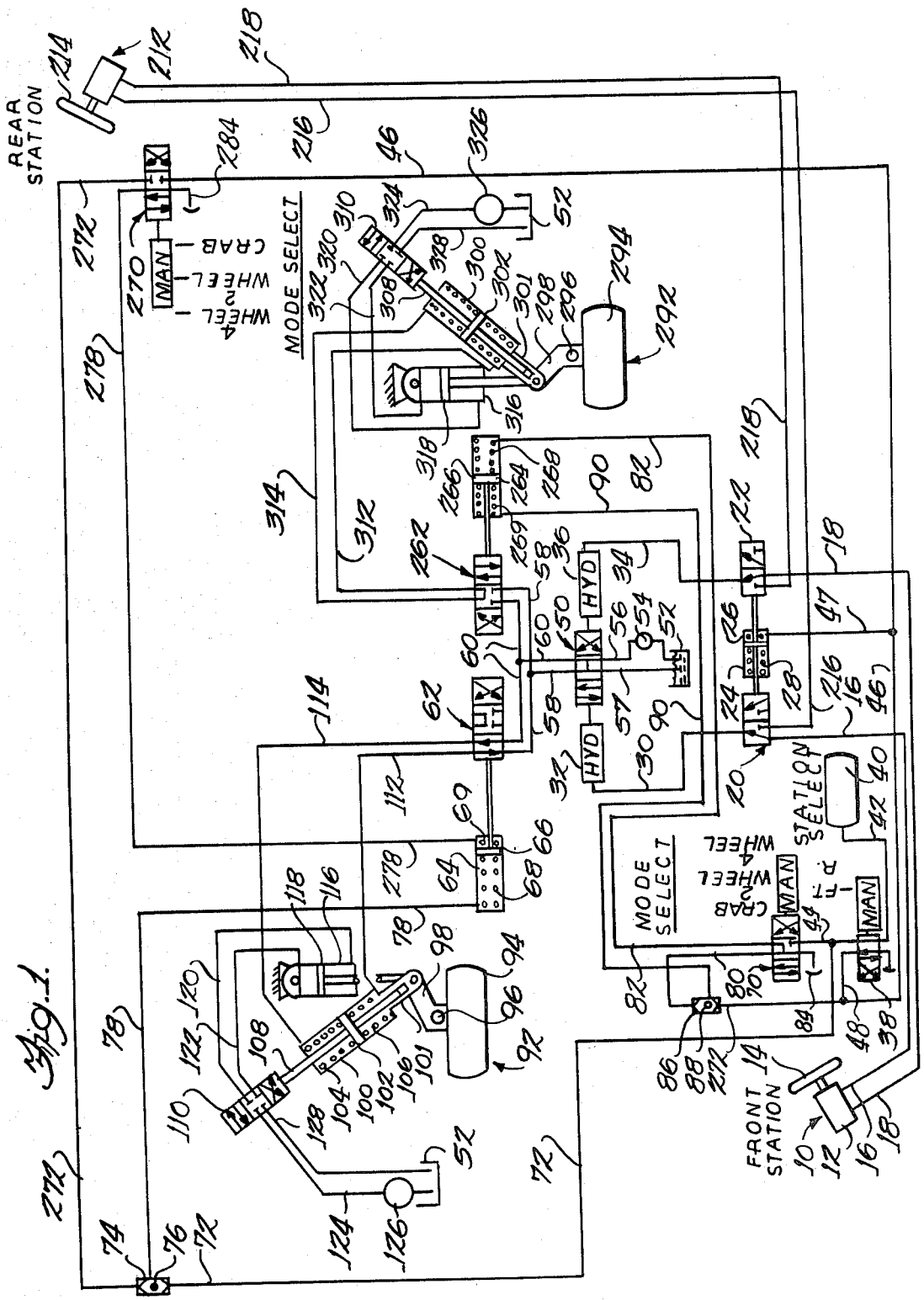

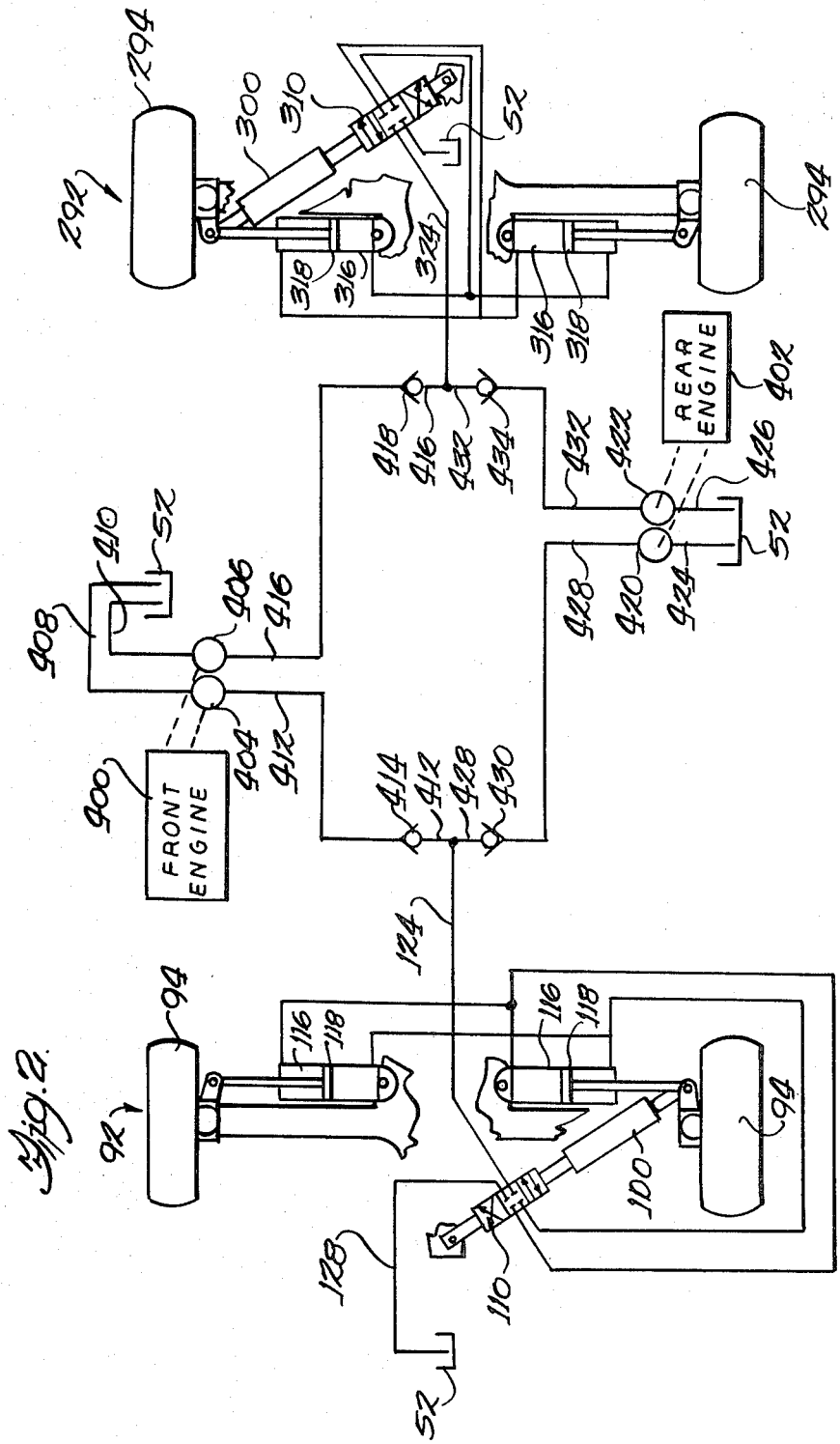

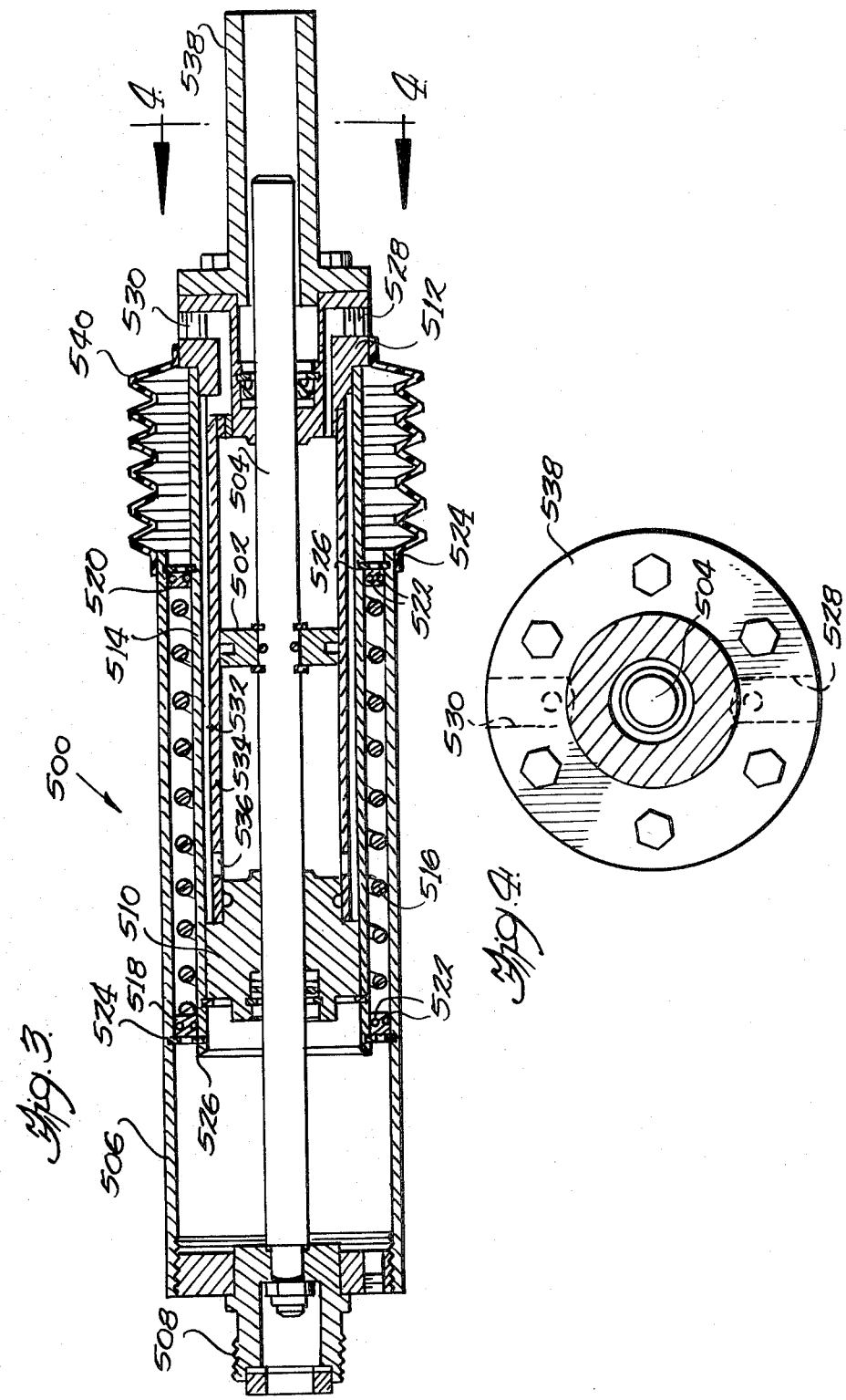

SENSING CYLINDER

CROSS REFERENCE TO RELATED APPLICATION

This is a division of application Ser. No. 52,940, filed July 7, 1970, now abandoned.

This application is related to that disclosed and claimed in the application of Robert G. Luft and Edward A. Bott entitled DRIVE TRAIN FOR LOW PROFILE VEHICLE, Ser. No. 796,371 filed Feb. 4, 1969, now U.S. Pat. No. 3,614,989.

BACKGROUND AND SUMMARY OF THE INVENTION

In certain large vehicles, such as those utilized to tow the jumbo jet aircraft, the size of the machine requires a control compartment or operator's station at each end thereof. Such dual operator stations are provided so that the operator may be positioned the forward end of the vehicle regardless of its direction of travel, thus providing the operator with optimum visibility in that direction. These dual stations impose a requirement for steering the vehicle from two different locations. Since vehicles of this type are maneuvered in close proximity to aircraft, damage to which must be avoided, it is highly desirable to permit the operator to select different modes of steering for the vehicle. This is especially advantageous when the vehicle itself is quite large and the turning radius with only one mode of steering may, in some situations, be too large, and in other situations, may be too sharp.

It is an object of this invention to provide a sensing cylinder for the steering system on a vehicle having plural mode steering capability which will automatically return the wheels to a straight-ahead position when a mode of steering is selected which dictates such an attitude.

Another object is to provide a sensing cylinder which both assists the initiation of steering and controls the position of a valve directing hydraulic fluid to the steering rams.

A further object of this invention is to provide a sensing cylinder which offers minimum resistance to movement from a static position.

These, and other objects of the present invention, and many of its attendant advantages, will become more readily apparent upon a perusal of the following description and the accompanying drawings, wherein:

FIG. 1 is a schematic representation of a steering system according to the present invention;

FIG. 2 is a schematic view of a preferred arrangement for providing hydraulic fluid under pressure to the steering rams;

FIG. 3 is a cross sectional view of a preferred embodiment of sensing cylinder utilized in the system shown in FIG. 1; and FIG. 4 is a cross sectional view taken on line 4—4 of FIG. 3.

DESCRIPTION OF A PREFERRED EMBODIMENT

Referring now to FIG. 1, a vehicle, not shown but which may be of the type disclosed in patent application Ser. No. 796,371 filed Feb. 4, 1969, is provided with a control compartment or operator's station at the front, indicated generally at 10, and a similar station 12 at the rear of the vehicle. The front station 10 includes a hand pump 12 connected with and operated by a steering wheel 14. The rear station has a similar hand pump 212 connected with and driven by the steering wheel 214. Conduits 16 and 18 connect with the hand pump 12 and with one of the hand pump selector valves 20 and 22, respectively. Conduits 216 and 218 connect with the hand pump 212 in the rear station and with the hand pump selector valves 20 and 22, respectively. The valves 20 and 22 are of the three-port, two-position type, with their positions selected by a position cylinder 24, which includes a piston 26 connected with the valves 20 and 22. A spring 28 biases the piston 26 to the position shown in FIG. 1, which position renders the rear hand pump 212 inoperable since the conduits 216 and 218 are blocked by the valves 20 and 22. In this position, the conduit 16 communicates with a conduit 30 connected with a hydraulic actuator 32 and the conduit 18 communicates with a conduit 34 connected with a hydraulic actuator 36.

The position of the piston 26 within the cylinder 24 is determined by the station selector valve 38 located in the front station 10. The station selector valve 38 is of the four-port, two-position type and connects with a reservoir 40 containing air under pressure through a conduit 42. Conduits 44 and 46 connect with the selector valve 38 as does a conduit 48 which is vented to atmosphere. Branch conduit 47 connects with the conduit 46 and with the cylinder 24. With the station selector valve positioned to select the front station, as shown in FIG. 1, the conduits 47 and 46 are vented to atmosphere through conduit 48. This permits the spring 28 to shift the piston 26 toward the right as viewed in FIG. 1 connecting the conduits 16 and 18 from the front hand pump 12 with the conduits 30 and 34. When the station selector valve 38 is shifted to the right as viewed in FIG. 1 to permit steering control by the steering wheel 214, the conduit 44 is connected with the exhaust conduit 48 and pressure from the reservoir 40 is permitted to flow through conduits 46 and 47 to the cylinder 24. Pressure acting on the piston 26 will shift the piston and both valves 20 and 22 to the left. In this position the valves 20 and 22 block the conduits 16 and 18 and connect the conduits 216 and 218 with the conduits 30 and 34, respectively.

Regardless of which station has been selected by manipulation of the station selector valve 38, hydraulic pressure will appear in one of the conduits 30 and 34 depending upon the direction of rotation of the steering wheel 14 or 214 in the selected station. The hydraulic actuators 32 and 36 are connected with a three-position directional flow valve 50. Hydraulic fluid under pressure is provided to the valve 50 from a reservoir 52 by a hydraulic pump 54 which communicates with the valve 50 through a conduit 56. A return conduit 57 connects with the valve 50 and the reservoir 52. Each of the conduits 58 and 60 are branched to permit connection with each of two mode control valves 62 and 262 when the rotation of either of the pump 12 or 212 provides hydraulic pressure in conduit 30 the hydraulic actuator 32 will shift the direction flow valve 50 to the right, i.e., to the right of the position shown in FIG. 1, in which the conduit 56 will be connected with the conduit 60 and the conduit 58 with the conduit 57. When the rotation of either of the hand pumps 12 or 212 is in a direction to provide hydraulic pressure in line 34, the hydraulic actuator 36 will shift the direction flow valve 50 to the left as viewed in FIG. 1, wherein conduit 56 will be connected with conduit 58 and conduit 60 will be connected with conduit 57.

The mode control valves 62 and 262 are of the three-position, four-port type and their position is determined by mode control cylinders 64 and 264. Each of the mode control cylinders 64 and 264 are provided with pistons 66 and 266 which are connected with the mode control valve 62 and 262, respectively. The piston 66 is urged toward a centered position within the cylinder 64 by means of springs 68 and 69, while the piston 266 is urged toward a center position within its cylinder 264 by means of springs 268 and 269. Each of the pistons 66 and 266 are capable of assuming three different positions within the cylinder. That is, each can be centered, fully extended or fully retracted. The position of the mode control cylinders is determined in part by the station selector valve 38 and in part by a mode selector valve 70 which is located in the front station 10 or by the similar mode selector valve 270 located in the rear station 12.

Each of the mode selector valves 70 and 270 are of the three-position, four-port type and when centered provide for two wheel steer from the wheels adjacent the operator's station selected by the station selector valve 38, and are shiftable from the centered position in one direction to provide crab steering of all four wheels and in the other direction to provide coordinated steering of all four wheels. The mode selector valve 70 is operable only when the station selector valve 38 is positioned for front station operation, while the mode selector valve 270 is operable only when the station selector valve 38 has been moved to the rear position. When the station selector valve is in front position, as shown in FIG. 1, air pressure is provided from the air reservoir 40 through the conduits 42 and 44 to a conduit 72 which connects with the conduit 44. Conduit 72 connects with a double-seated T connector 74 containing a ball check valve 76. A conduit 78 communicates with the T connector 74 at a point intermediate the two seats and with the head end side of the cylinder 64. The presence of air pressure in the head end side of the cylinder 64 will cause the piston 66 to be shifted to the right against the bias of the spring 69. Regardless of the position of the mode selector valve 70, the piston 66 in the mode control cylinder 64 will be in its extended position since air pressure is directed to the head end side of the cylinder by the station selector valve 38. The mode selector valve 70 then is utilized to direct pressure selectively to either end of the mode control cylinder 264 in order to determine what mode of steering will be utilized. In the position shown in FIG. 1, the mode selector valve has been centered so that the conduit 44 which receives air pressure from the reservoir 40 has been blocked. Two conduit 80 and 82 connected with the mode selector valve 70 are in communication with a conduit 84 which exhausts to atmosphere. The conduit 80 connects with a double-seated T connector 86 having a ball check valve 88. A conduit 90 communicates with the T connector at a point intermediate the seats and with the rod end side of the mode control cylinder 264. The conduit 82 connects with the head end side of the cylinder 264. With both the conduits 90 and 82 being exhausted to atmosphere through the conduit 84, the springs 268 and 269 within the cylinder 264 will cause the piston 266 to be centered. When the mode selector valve 70 is moved to the crab position, or to the left as viewed in FIG. 1, conduit 44 will be connected with the conduit 80 while the conduit 82 will be exhausted to atmosphere through the conduit 84. Air pressure will be directed through the conduits 42, 44, 80 and 90 to the rod end side of the cylinder 264. The head end side of the cylinder will be exhausted to atmosphere through the conduits 82 and 84. The presence of high pressure in the rod end side of the cylinder will cause the piston 266 to be retracted moving the mode control valve 262 to the right as viewed in FIG. 1. When the mode selector valve 70 is moved to the four-wheel position, the conduit 44 will be connected with the conduit 82 while the conduit 80 will be exhausted to atmosphere through the conduit 84. Air pressure will therefore be directed through the conduit 82 to the head end side of the cylinder 264 causing the piston 266 to be extended and the mode control valve 262 to be moved to the left.

The mode selector valve 270 in the rear station 12 is provided with an exhaust conduit 284 and with a conduit 272 which communicates with the T connector 74 opposite the connection of the line 72 therewith. Another conduit 278 connects with the valve 270 and with the rod end side of the cylinder 64. With the station selector valve in the front position, manipulation of the mode selector valve 270 will be completely ineffective because the conduit 46 is connected with atmosphere through conduit 48 and the presence of air pressure in the conduit 72 will cause the ball 76 to seat against the conduit 272. When the station selector valve 38 is moved to the rear position air pressure will be directed to the conduit 46 and to a conduit 272 which connects with the conduit 46 and with the T connector 86 on the side opposite the connection of the conduit 80 therewith. The presence of air pressure in the conduit 272 will seat the ball check valve 88 against the conduit 80 and permit air pressure to pass through the conduit 90 to the rod end side of the cylinder 264. The piston 266 will be retracted moving the mode control valve 262 to the right as viewed in FIG. 1. This position of the mode control cylinder will be maintained as long as the station selector valve is in the rear position irrespective of the manipulation of the mode selector valve 270 in the rear station. The mode selector valve 270 will therefore direct air pressure to the selected ends of the mode control cylinder 64 in order to determine the position of the mode control valve 62, which will determine the mode of steering for the vehicle. In its centered two-wheel position, the mode selector valve 270 will connect both conduits 78 and 72 with the atmosphere through the conduit 284. This will permit the springs 68 and 69 in the cylinder 64 to center the piston 66 and the valve 62. When the mode selector valve is shifted to the crab position, conduit 46 will be connected with the conduit 272 while the conduit 278 will be connected with atmosphere through the conduit 284. The presence of high pressure in the head end of the cylinder 64 will cause the piston 66 to be extended moving the mode control valve 62 to the right. When the mode selector valve 270 is moved to the four-wheel position, the conduit 46 will be connected with the conduit 278 while the conduit 272 will be vented to atmosphere through the conduit 284. The presence of high pressure in the conduit 278 will cause the piston 66 to be retracted moving the valve 62 to the left. With the station selector valve 38 in the rear position, manipulation of the mode selector valve 70 in the front station 10 will have no effect on either of the mode control cylinders 64 and 264. This is because the conduit 44 is vented to atmosphere through the conduit 48 and the presence pressure in the conduit 272 causes the ball check valve 88 to be seated sealing off the conduit 80.

Considering first the front axle. which is indicated generally at 92, a pair of steerable wheels, one of which is shown at 94 is pivotable about an upright axis defined by the pin 96 through a steering arm 98. A sensing cylinder 100 includes a piston 102 which is centered within the cylinder by means of springs 104 and 106. A piston rod 108 is connected to the piston 102 and extends in each direction beyond the piston to provide equal displacements. One end of the rod is connected with a main power steering valve 110. The cylinder 100 has an extension 101 which is pivotally connected to the steering arm 98. A conduit 112 extends from the mode control valve 62 to one end of the cylinder 100 and a second conduit 114 extends from the mode control valve 62 to the other end of the cylinder 100. A steering ram 116 has a piston 118 which is pivotally attached to the steering arm 98. A conduit 120 connects with the main power steering valve 110 and with the rod end side of the cylinder 116 and a second conduit 122 connects between the valve 110 and the head end side of the cylinder 116. A conduit 124 provides a connection between the main steering pump 126 and the valve 110. Another conduit 128 provides a return from the valve 110 to the reservoir 52. When hydraulic pressure is present in the conduit 114, the piston 102 and the rod 108 will be shifted against the bias of the spring 106 toward the right causing the valve 110 to shift in that direction. Since movement of the valve 110 is limited to a small fraction of an inch, the piston 102 will become fixed and the cylinder 100 will be moved upward and to the left. The steering arm 98 and the wheel 94 will be pivoted counterclockwise. Movement of the piston rod 108 in this direction will cause the main power steering valve 110 to be moved downward and to the right, whereby the conduit 124 will be connected with the conduit 120 while the conduit 122 will be connected with the reservoir through the conduit 128. The pressure in conduit 120 will be communicated to the head end side of the ram 116 causing the piston 118 to be retracted. Retraction of the piston 118 will also cause the wheel 94 to be pivoted in a counterclockwise direction about the pivot pin 96. The presence of pressure in the conduit 112 will have the opposite effect. That is, the piston 102 will be shifted upward and the cylinder 100 will be shifted downward causing the wheel 94 to be pivoted clockwise, while simultaneously shifting the valve 110 so that the conduit 124 is connected with the conduit 122 and the conduit 120 with the conduit 128. The hydraulic fluid from the pump 126 will then be available to extend the piston 118 and assist the sensing cylinder in turning the wheel 94 counterclockwise. The end to which and the amount of pressure admitted to the sensing cylinder by the valve 50 is determined by the direction and degree of rotation of the hand pump. Once the wheel 94 has attained a position such that the force of the compressed spring within the cylinder is equal to this pressure, the next incremental movement of the steering ram will create a greater spring force which will urge the valve 110 to its center position, although not completely centering the piston 102 within the cylinder 100. One of the springs will, therefore, be compressed. With the valve 110 centered the steering action will cease and the steering ram hydraulically locked in position.

The action of the rear axle components numbered 292-328 are indentical with that of the comperable components with corresponding reference numbers of value 200 less on the front axle. However, when the selected station has been in either crab or 4-wheel steer and the mode selector valve in that station is moved to 2-wheel steer the mode control cylinder on the end opposite the selected station will be centered causing the associated mode control valve to be centered. In its centered position, the mode control valves connect the two conduits leading to the sensing cylinder. If the axle on the end opposite the selected station has its wheels in other than the straight ahead position, the interconnection of the two ends of the sensing cylinder will permit the springs therein to attempt to center the piston within the cylinder. This action will shift the main power steering valve in a direction to direct hydraulic fluid from the main power steering pump to the steering ram in order to pivot the wheels to a straight ahead position.

Referring now to the preferred manner of supplying the hydraulic fluid for the main power steering valves shown in FIG. 2, the vehicle is provided with a front engine 400 and a rear engine 402. A pair of pumps 404 and 406 are driven by the front engine 400. The pumps 404 and 406 are connected with the reservoir through conduits 408 and 410, respectively. A conduit 412 connects with the output of the pump 404 and connects with the conduit 124 communicating with the main power steering valve 110. A one-way check valve 414 is provided in the conduit 412 and permits fluid flow only from the pump 404 toward the conduit 124. A conduit 416 connects with the pump 406 and with the conduit 324 leading to the main power steering valve 310 on the rear axle. A one-way check valve 418 is provided in the conduit 416 and permits fluid flow only from the pump 406 to the conduit 324. A pair of pumps 420 and 422 are driven by the rear engine 402. Conduits 424 and 426 connect between the reservoir 52 and the pumps 420 and 422, respectively. A conduit 428 connects with the output of pump 420 and with the conduit 124. A one-way check valve 430 is provided in the conduit 428 and permits fluid flow only from the pump 420 toward the conduit 124. A conduit 432 connects with the pump 422 and with the conduit 324. A one-way check valve 434 is provided in the conduit 432 and permits fluid f'ow only from the pump 422 toward the conduit 324.

The pump arrangement as described above, will provide hydraulic f'uid under pressure to both of the conduits 124 and 324 even though only one of the engines 400 and 402 are operating. This permits all three modes of steering, which necessitates actuation of both axles for the crab steer and four-wheel steer modes, when one engine has been disabled or is otherwise not functioning. The pumps 404, 406, 420 and 422 replace the pumps indicated by the numerals 126, 326 and 54 in the system shown in FIG. 1. While FIG. 2 shows the connections necessary to replace the pumps 126 and 326, it will be obvious to one of skill in the art that one of the two pumps 404 and 406 and one of the two pumps 420 and 422 may be joined with a double check valve arrangement to supply hydraulic fluid to the conduit 56 of FIG. 1.

Referring now to the preferred form of sensing cylinder, which would be utilized for the components indicated by the numeral 100 and 300 in the embodiments of FIGS. 1 and 2, the sensing cylinder indicated generally at 500 is provided with a piston 502 which is sealingly secured by conventional means to a piston rod 504. The piston rod 504 extends on either side of the piston 502 a sufficient distance in order to provide equal displacement of hydraulic fluid in both directions of movement. One end of the piston rod is secured to an outer sleeve 506 and through a coupling means 508 to the main power steering valve, such as those indicated by the reference numerals 110 and 310 in FIG. 1. A pair of glands 510 and 512 are slidable on the piston rod 504 and are provided with conventional seals to prevent leakage therebetween. An outer tube 514 is secured between the two glands 510 and 512. A compression spring 516 is positioned within the sleeve 506 and encircles the outer circumference of the tube 514. A pair of spacer elements 518 and 520 are positioned between the sleeve 506 and the outer tube 514 and are engageable by the compression spring 516. Each of the spacer elements 518 and 520 are provided with inserts 522, which preferably are of a low static coefficient of friction material such as polytetrafluoroethylene, and are engageable with the inner surface of the sleeve 506 and the outer surface of the outer tube 514. The spacers serve to position the outer tube 514 with respect to the sleeve 506 and the inserts 522 readily permit relative sliding between the spacers 518 and 520 and the sleeve 506 and the tube 514. A pair of snap rings 524 are positioned on the outer sides of the spacers 518 and 520 and engage grooves formed on the inner periphery of the sleeve 506. A similar pair of snap rings 526 engage grooves formed in the outer surface of the outer tube 514. The compression spring 516 urges the spacer elements into contact with the snap rings 524 and 526. Movement of the tube 514 in either direction relative to the sleeve 506 will cause compression of the spring 516. A port 528 in the gland 512 provides fluid communication to the right hand side of the piston 502 as viewed in FIG. 3. Fluid communication to the other side of the piston 502 is provided through a port 530 which communicates with an annular space 532 formed by an inner tube 534 secured between the glands 510 and 512 and having a smaller radius than the inner surface of the outer tube 514. The piston 502 sealingly engages the inner surface of the inner tube 534. Openings 536 permit fluid communication between the interior of the inner tube 534 and the annular space 532.

It can be seen that if the piston rod 504 is restrained, the admission of hydraulic fluid under pressure through the port 528 will cause the glands 512 and 510 and the tubes 514 and 534 to be moved toward the right as viewed in FIG. 3, while the admission of hydraulic fluid pressure through the port 530 will cause both tubes and both glands to move as a unit to the left. A connector member 538 is secured to the gland 512 and is pivotally connectable to one of the steering arms such as 98 or 298.

As explained previously with respect to the inserts 522, it is important that the sensing cylinder be readily actuated in order to provide good steering sensitivity, and for this reason it is highly desirable to maintain friction between the moveable parts at a minimum. Since corrosion is a large contributing factor to friction, means are provided to minimize the possibility of corrosion. For this purpose, a collapsible boot 540 is secured at one end to the outer surface of the sleeve 506 and at its other end to the gland 512. This boot 540 precludes the entrance of contaminants to the outer surface of the outer tube. In addition, the frictional forces are maintained at a minimum by chrome plating the inner surface of the sleeve 506 and the outer surface of the outer tube 514. This permits the polytetrafluroethylene rings 522 to be in contact with a smooth surface of relative corrosion resistance and maintains the coefficient of friction between the teflon rings 522 and the surfaces at a minimum.

While preferred embodiments have been disclosed with respect to the general steering system and component portions thereof, it is to be understood that various changes and modifications may be made without departing from the spirit of the invention as defined by the scope of the appended claims.

What is claimed is:

1. In a sensing cylinder for a power steering mechanism associated with a steerable axle including a steering arm, the improvement comprising:
   a piston including a rod;
   a tube slidably engageable with the piston;
   gland means secured to each end of the tube and sealingly engaging the rod;
   connector means attached to one of the gland means and capable of being pivotally attached to the steering arm;
   a sleeve secured to the rod;
   spring means between the tube and the sleeve;
   and retainer means engageable with the spring means the tube and the sleeve and capable of compressing the spring means whenever the tube means is moved in either direction from the position in which the piston is centered in the tube.

2. The invention according to claim 1, and further comprising:
   a boot means connected between the sleeve and said one gland means.

3. The invention according to claim 2, wherein the facing surfaces of said tube and sleeve are plated with a material to resist corrosion.

4. The invention according to claim 3, and further comprising:
   insert rings in said retaining means of a material having a low coefficient of static friction.

5. The invention according to claim 4, wherein said insert rings are made of polytetrafluorethylene.

* * * * *